(12) United States Patent
McCollom

(10) Patent No.: US 9,417,152 B2
(45) Date of Patent: Aug. 16, 2016

(54) COMBINATION SMOKE MACHINE AND NITROGEN GENERATOR

(71) Applicant: Gregory M. McCollom, Anaheim, CA (US)

(72) Inventor: Gregory M. McCollom, Anaheim, CA (US)

(73) Assignee: STAR EnviroTech, Inc., Huntington Beach, CA (US)

( * ) Notice: Subject to any disclaimer, the term of this patent is extended or adjusted under 35 U.S.C. 154(b) by 415 days.

(21) Appl. No.: 14/063,243

(22) Filed: Oct. 25, 2013

(65) Prior Publication Data

US 2015/0114091 A1    Apr. 30, 2015

(51) Int. Cl.
*G01M 3/04* (2006.01)
*G01M 3/22* (2006.01)

(52) U.S. Cl.
CPC .. *G01M 3/04* (2013.01); *G01M 3/22* (2013.01)

(58) Field of Classification Search
CPC ........................................................ G01M 3/04
USPC ......................................................... 73/40.7
See application file for complete search history.

(56) References Cited

U.S. PATENT DOCUMENTS

| 5,922,944 | A | 7/1999 | Pieroni et al. |
| 6,477,890 | B1 | 11/2002 | Hulsebus |
| 6,526,808 | B1 | 3/2003 | Pieroni et al. |

FOREIGN PATENT DOCUMENTS

| GB | 640266 | 7/1950 |
| GB | 1039729 | 8/1966 |
| GB | 1240867 | 7/1971 |

OTHER PUBLICATIONS

South-Tek Systems, Membrane Nitrogen Gas Generation Systems, 2009, pp. 1-17.*

* cited by examiner

*Primary Examiner* — Hezron E Williams
*Assistant Examiner* — David Z Huang
(74) *Attorney, Agent, or Firm* — Morland C. Fischer

(57) ABSTRACT

A portable, hand-held combination smoke machine and nitrogen generator having particular application for supplying a mixture of smoke and inert, non-combustible nitrogen gas to a closed fluid system (e.g., the evaporative or air brake system of a motor vehicle) so that the presence and location of a leak can be detected. The nitrogen generator is preferably a compact, commercially-available nitrogen generating membrane tube that is sized to be grasped and lifted in the hand of a user. The smoke machine has a smoke generator device that is adapted to produce smoke and is coupled to the nitrogen generating membrane tube so that a supply of nitrogen gas is delivered from the tube to the smoke generator device at which to be mixed with smoke. The nitrogen gas carries the smoke outwardly from the smoke generator device of the smoke machine to the system being tested for leaks.

20 Claims, 3 Drawing Sheets

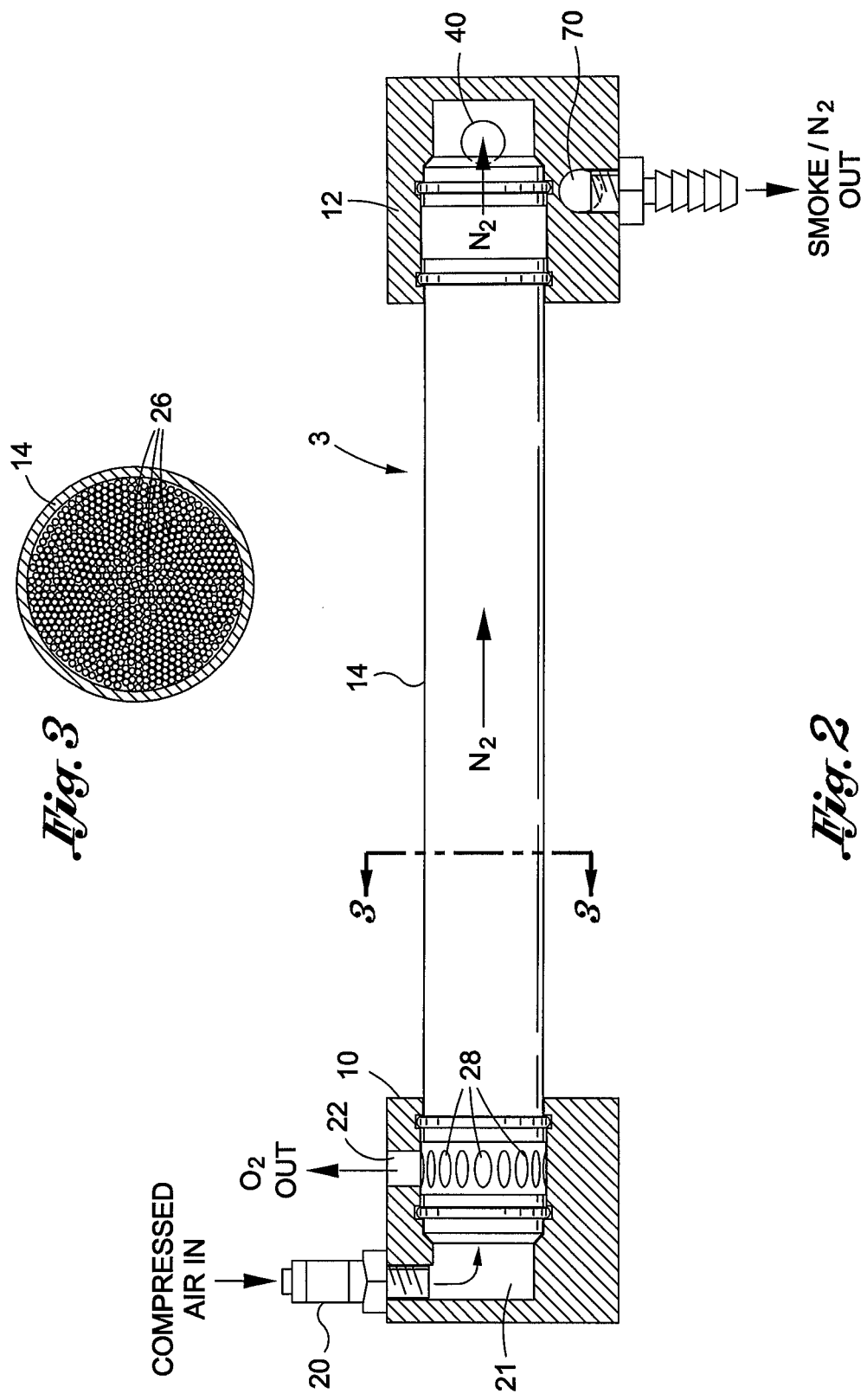

COMBINATION SMOKE MACHINE AND NITROGEN GENERATOR

BACKGROUND OF THE INVENTION

1. Field of the Invention

This invention relates to a combination smoke machine and nitrogen generator having particular application for providing a mixture of "smoke" and nitrogen gas to a closed fluid system (e.g., the evaporative or air brake system of a motor vehicle) that is undergoing testing for leaks. The combination is advantageously compact, lightweight, easy to transport in the hand of a user and capable of relatively long operation with little downtime or maintenance required.

2. Background Art

Smoke generating apparatus are known for generating a visible gas or vapor that is mixed with air supplied thereto under pressure so that the mixture can be delivered to a fluid system undergoing testing for leaks. While such apparatus are commonly described as smoke machines, the "smoke" may be a non-toxic aerosol mist produced by evaporation and condensation at controlled temperatures rather than actual smoke which is a product of partial combustion and tends to contain toxic combustion byproducts. Hence, in the preferred embodiment to be described below, "smoke" refers to either a (e.g., petroleum-based) solution that is heated and vaporized or to a visible aerosol mist, spray, gas, vapor or combination thereof that is heated or not. Some smoke generating apparatus have been used to detect leaks in the evaporative system of a motor vehicle. By observing any visible "smoke" which exits a small and often visually imperceptible hole in the system under test, an indication is provided to the observer of the presence and location of the leak so that a repair might be made.

Because of the concerns for the environment, it has become even more important to be able to test the integrity of the evaporative system of a motor vehicle so as to determine the presence and the location of a leak in need of repair. To accomplish the foregoing, smoke has been mixed with and carried by nitrogen gas, rather than air, from a smoke generator to the system under test. Nitrogen gas is an ideal carrier for the smoke because of its non-flammable and inert characteristics. That is, the smoke and nitrogen gas are relatively safe for testing systems which lie in a generally volatile environment and are surrounded by potentially explosive hydrocarbon vapors. Therefore, mixing smoke and nitrogen gas provides a safe and efficient means for locating a leak in the evaporative system of a motor vehicle. Moreover, providing a supply of smoke to the system undergoing testing by means of a nitrogen gas carrier, rather than air, enables a variety of high pressure systems, such as an air brake system and the like, to be tested at high operating temperatures, but without the inherent risk of an explosion. Reference may be made to U.S. Pat. No. 6,526,808 issued Mar. 4, 2003 to the assignee of this application for an example of a smoke-generating machine which employs nitrogen gas to carry smoke to a system being tested for leaks.

Nitrogen gas to be used alongside a smoke machine is often stored in and dispensed from relatively long, heavy and bulky cylinders that are inconvenient to lift and transport. Consequently, the nitrogen cylinders are commonly moved from place-to-place on a correspondingly large cart or inside a large cabinet. What is more, such nitrogen gas cylinders must be refilled from time-to-time which introduces added cost and delay to the leak testing process. Because of its size, it may be impractical to incorporate a traditional nitrogen gas cylinder with a smoke machine to achieve a compact, fully-integrated assembly that can be lifted and transported in the hand of a user.

SUMMARY OF THE INVENTION

In general terms, a portable, hand-held combination smoke machine and nitrogen generator are disclosed having particular application for supplying a mixture of smoke and nitrogen gas to a closed fluid system (e.g., the evaporative or air brake system of a motor vehicle) so that the presence and location of a leak can be visually detected by observing any smoke which exits the system at the leak site. The nitrogen generator preferably includes a commercially available nitrogen generating membrane tube that is coupled to and spaced from the smoke machine by means of front and rear manifolds. Compressed air which is supplied to the nitrogen generating membrane tube via the front manifold is stripped of its oxygen, such that the oxygen is exhausted from the tube to the atmosphere. The remaining pure nitrogen gas which exits the nitrogen generating membrane tube at the rear manifold is supplied to a smoke generator device of the smoke machine. The nitrogen generating membrane tube of the nitrogen generator performs the dual functions of generating a supply of nitrogen gas for delivery to the smoke generator device of the smoke machine and forming a convenient handle to be grasped so as to permit the smoke machine to be lifted and transported in the hand of a user.

The smoke machine includes a sealed enclosure which, in a preferred embodiment, contains a liquid (e.g., petroleum) solution that is adapted to be vaporized into smoke. A liquid intake channel runs upwardly through the liquid within the enclosure of the smoke machine, and a (e.g., resistance) heating element lies inside and is surrounded by the liquid intake channel. Nitrogen gas is delivered by way of a pressure regulator from the nitrogen generator to the liquid intake channel of the smoke machine. Some of the liquid solution within the enclosure of the smoke machine is suctioned by the nitrogen gas through an orifice formed in the liquid intake channel. A voltage is supplied from a power supply to heat the heating element so that the liquid which is suctioned through the orifice into contact with the heating element surrounded by the liquid intake channel is automatically vaporized into smoke. Accordingly, inert, non-combustible nitrogen gas is mixed inside the sealed enclosure of the smoke machine with the smoke produced by vaporizing the liquid solution. The nitrogen gas carries the smoke outwardly from the enclosure of the smoke machine to the system to be tested for leaks by way of a smoke supply hose that is coupled between the smoke machine and the system under test.

BRIEF DESCRIPTION OF THE DRAWINGS

FIG. 2 is an enlargement of the nitrogen generator of the combination smoke machine and nitrogen generator shown in FIG. 1;

FIG. 3 is a cross-section through the nitrogen generator taken along lines 3-3 of FIG. 2.

DESCRIPTION OF THE PREFERRED EMBODIMENT

Figure 1:
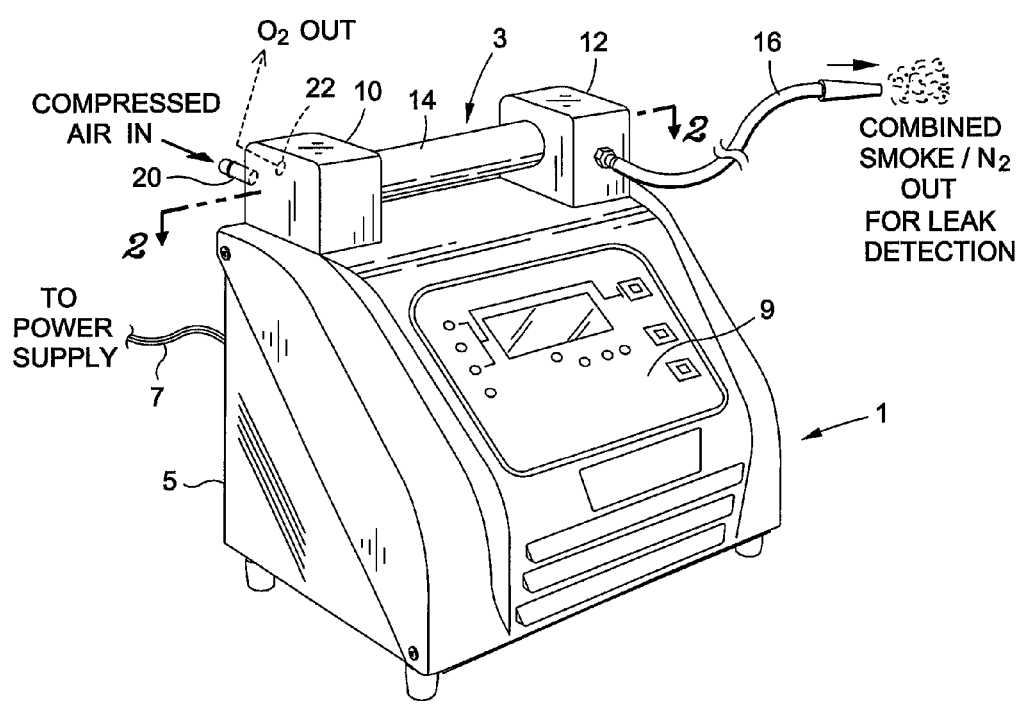
FIG. 1 shows a compact, hand-held combination smoke machine and nitrogen generator in accordance with a preferred embodiment of this invention for detecting the presence and location of a leak in a system undergoing testing.

A combination compact, hand-held smoke machine 1 and nitrogen generator 3 is disclosed while initially referring to FIG. 1 of the drawings. The combination herein disclosed has particular application to communicate with a closed fluid system that is undergoing a test for leaks. Systems which can be tested by the combination smoke machine 1 and nitrogen generator 3 are those common to a motor vehicle and include, but are not limited to, the evaporative or air brake system thereof. However, it is to be understood that the combination smoke machine 1 and nitrogen generator 3 may communicate with other closed systems (e.g., a plumbing system, a turbocharged system or other systems that will be tested in an environment containing potentially explosive gases). In any case, "smoke" is produced by the smoke machine 1 and delivered to the system being tested so that the system can be visually inspected for the escape of smoke to indicate the presence and location of a leak.

As will be described in greater detail hereinafter and as an important feature of this invention, the aforementioned combination is relatively lightweight (about 12 to 20 pounds) and portable in the hand of a user. In this regard, and in accordance with a preferred embodiment, the nitrogen generator 3 performs the dual functions of providing a supply of nitrogen gas to the smoke machine 1 and forming a handle connected to the smoke machine to facilitate the convenient lifting and transport thereof, whereby the overall weight and size of the combination is reduced relative to conventional leak detecting apparatus.

Figure 4:
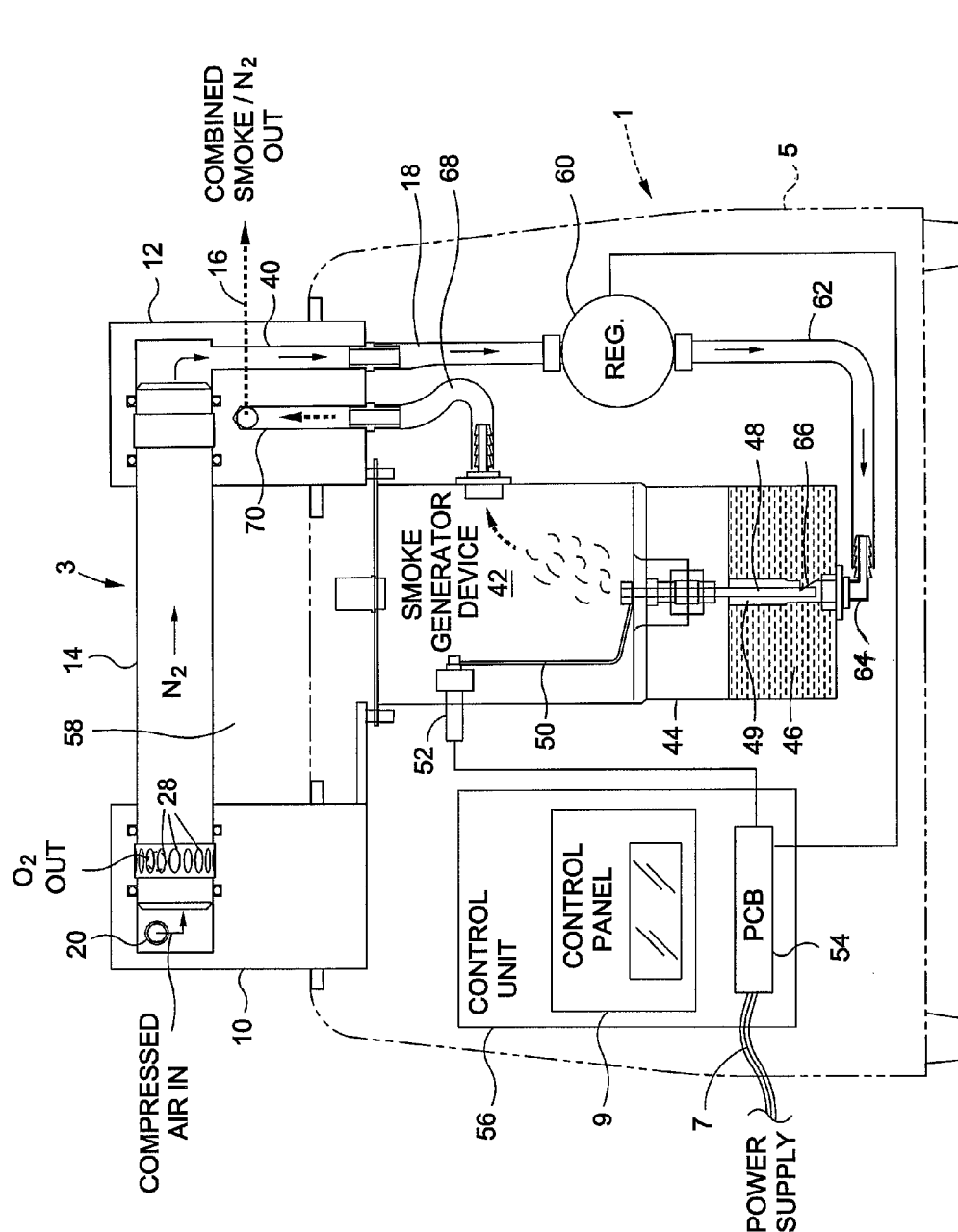
FIG. 4 shows the details and integration of the smoke machine and nitrogen generator to form the compact, hand-held combination of FIG. 1.

The smoke machine 1 of the combination smoke machine and nitrogen generator includes an outside housing 5. By way of example only, the housing 5 is manufactured from a lightweight and durable material such as plastic, or the like. As is best shown in FIG. 4, the housing 5 surrounds a smoke generator device (designated 42) of smoke machine 1. A power line 7 extends from a heating element (designated 48 in FIG. 4) of the smoke generator device 42 at the interior of the housing 5 to a suitable AC or DC voltage source. The power line 7 provides a voltage by which to energize the heating element 48 and thereby enable the smoke generator device 42 to create a supply of smoke to be delivered to the system being tested for leaks in a manner that will soon be described.

A control panel 9 is manually and visually accessible on the housing 5 of the smoke machine 1. The control panel 9 is part of the control unit (designated 56 in FIG. 4) which controls the operation of the smoke machine 1. The control panel 9 enables the user to selectively control the process during which smoke is created by the smoke generator device 42 within the housing 5 and delivered under a pre-determined suitable pressure to the system that is undergoing the testing for leaks. By way of example, the control panel 9 can be operated to enable the user to control the temperature of the heating element 48 (and the volume of smoke created by the smoke generator device 42) and the rate at which the smoke is delivered from device 42 to the system under test.

The dual functioning nitrogen generator 3 of the combination smoke machine and nitrogen generator includes a front manifold 10 at one end thereof and a rear manifold 12 at the opposite end. The front and rear manifolds 10 and 12 are manufactured from a suitable material such as aluminum, or the like. A nitrogen generating membrane tube 14 extends between the front and rear manifolds 10 and 12 of the nitrogen generator 3. The front and rear manifolds 10 and 12 mechanically connect the nitrogen generating membrane tube 14 to the outside housing 5 of the smoke machine 1 such that the tube is spaced from the housing and a space (designated 58 in FIG. 4) is established therebetween within which to receive the hand of the user, whereby the tube 14 forms the aforementioned handle around which the user's hand can be wrapped in order to lift and transport the smoke machine 1. The rear manifold 12 also holds the nitrogen generating membrane tube 14 in fluid communication with the smoke generator device 42 of the smoke machine 1 so that a supply of nitrogen gas can be delivered from tube 14 to device 42 and a mixture of nitrogen gas and smoke can be delivered from the device 42 to the system under test.

To this end, a smoke supply hose 16 extends from the rear manifold 12 of the nitrogen generator 3 so that the aforementioned mixture of nitrogen gas and smoke can be delivered via supply hose 16 from the smoke machine 1 to the system being tested for leaks. Moreover, a nitrogen intake hose (designated 18 in FIG. 4) is coupled to the nitrogen generating membrane tube 14 at the rear manifold 12 of the nitrogen generator 3 so that nitrogen gas can be delivered by intake hose 18 from nitrogen generating tube 14 to the smoke generator device 42 of the smoke machine 1.

An air input nozzle 20 is coupled to the nitrogen generating membrane tube 14 of the nitrogen generator 3 at the front manifold 10 thereof. As will be explained when referring to FIG. 4, the air input nozzle 20 is connected to a source of compressed air or any other suitable source of pressurized gas. An oxygen escape port 22 (of FIGS. 1 and 2) communicates with the nitrogen generating membrane tube 14 of nitrogen generator 3 by way of the front manifold 10. As will also soon be explained, oxygen which is extracted from the compressed air that is supplied to the nitrogen generating membrane tube 14 via input nozzle 20 is removed from tube 14 and exhausted to the atmosphere at the oxygen escape port 22 during the nitrogen generating process.

Turning to FIGS. 2 and 3 of the drawings, details are provided of the nitrogen generator 3 of the combination smoke machine 1 and nitrogen generator 3 shown in FIG. 1. As previously described, the nitrogen generator 3 includes a nitrogen generating membrane tube 14 that extends between the front and rear manifolds 10 and 12 of the nitrogen generator 3. The nitrogen generating membrane tube 14 produces a supply of nitrogen gas to be introduced to and mixed with smoke that is produced by the smoke generator device 42 (of FIG. 4) located within the housing 5 of the smoke machine 1. The nitrogen generating membrane tube 14 is commercially available and, for example, is a component of the HiFluxx® ST304 nitrogen generator manufactured by Parker Filtration and Separation, B.V. of the Netherlands. However, another inert, non-combustible gas that can be mixed with the smoke produced by the smoke generator device 42 is carbon dioxide.

The technique by which the nitrogen generating membrane tube 14 of the nitrogen generator 3 produces nitrogen gas to be mixed with smoke in the smoke machine 1 is known. That is, nitrogen generating membrane tube 14 includes filtration and separation membranes which have tightly packed oxygen permeable fibers, designated 26 and best shown in FIG. 3, that are adapted to extract oxygen from incoming compressed air such that the gas which exits tube 14 is limited to nitrogen gas. Briefly, and more particularly, filtered compressed air or any other suitable gas under pressure is delivered to the nitrogen generating membrane tube 14 by means of the air input nozzle 20 and an air flow channel 21 that extends from nozzle 20 through the front manifold 10 of the smoke generator 3. The incoming compressed air flows through and is filtered by the tightly packed oxygen-permeable fibers 26 of the nitrogen generating membrane tube 14, such that the relatively small oxygen molecules are pushed radially outwards against the inside wall of tube 14. The oxygen is forced under pressure along tube 14 and back towards the input manifold 10. The oxygen which has now been stripped from the incoming compressed air is exhausted to the atmosphere through an exhaust path including a series of circumferentially disposed exit openings 28 that are formed in the tube 14 and the oxygen escape port 22 that is formed in the front manifold 10 so as to communicate with exit openings 28.

Accordingly, the gas which exits the nitrogen generating membrane tube 14 is pure nitrogen gas. The nitrogen gas produced by the nitrogen generating membrane tube 14 of the nitrogen generator 3 is delivered to the smoke generator device 42 (of FIG. 4) of the smoke machine 1 by way of a nitrogen flow channel 40 which runs through the rear manifold 12 and the aforementioned nitrogen intake hose 18 (of FIG. 4) which extends between the nitrogen flow channel 40 and the smoke generator device 42.

Referring now to FIG. 4 of the drawings, the details and operation of the combination smoke machine 1 and nitrogen generator 3 are described for delivering a mixture of smoke and nitrogen gas to a system to be tested for leaks. Located within the outside housing 5 of the smoke machine 1 is the smoke generator device 42. In a preferred embodiment, the smoke generator device 42 includes a sealed enclosure 44 which contains a (e.g., non-toxic petroleum-based) liquid 46 that is adapted to be heated and vaporized into smoke. One suitable liquid 46 to be vaporized within the enclosure 44 of the smoke generator device 42 is mineral oil. A dye may be added to the liquid to enhance the visual detection thereof at the leak site.

However, smoke generating devices are known in the art, and the particular device referred to herein for use by the smoke machine 1 is not to be regarded as a limitation of the present invention. By way of example, reference can be made to U.S. Pat. No. 5,922,944 issued Jul. 13, 1999 to the assignee of this application for an example of a smoke generating device that contains a petroleum solution to be vaporized to produce smoke for use in detecting leaks. In this same regard, the smoke generator device 42 shown in FIG. 4 may be replaced by an atomizer or the like which does not require heat. Such an atomizer device produces a mist or vapor spray to be mixed with and carried by the nitrogen gas to the system being tested for leaks. Reference can also be made to U.S. Pat. No. 6,477,890 issued Nov. 12, 2002 to the assignee of this application for an example of a smoke vapor generator having a liquid nozzle that sprays a smoke-producing solution against an electrically-conductive heater element. What is even more, smoke can be generated by means of a porous oil transporting vaporizer tube that is submerged in an oil reservoir and wrapped in an electrically-conductive heater wire. Such an oil transporting vaporizer tube is shown and described in pending patent application Ser. No. 13/608,660 filed Sep. 10, 2013 and assigned to the assignee of this application.

In the case of the smoke generator device 42 shown in FIG. 4, a heating element 48 is located within the sealed enclosure 44 of device 42 so as to extend through the liquid 46 to be vaporized into smoke. The heating element 48 is received within and surrounded by a liquid intake channel 49 that runs upwardly from the bottom of enclosure 44 to the top of the liquid. The heating element (e.g., a resistance heating wire) 48 that is located within the liquid intake channel 49 is electrically connected to the power supply of the smoke machine 1 by way of a conductive wire 50, a terminal 52 that extends through the enclosure 44, and a printed circuit board 54 from the control unit 56 of smoke machine 1. By using the control panel 9 of the control unit 56 of the smoke machine 1, the application of an AC or DC voltage from the power supply to the heating element 48 can be selectively controlled to correspondingly control the heat generated by heating element 48 and the volume of smoke produced within the enclosure 44 of smoke generator device 42.

As was previously described, the nitrogen generator 3 is integrated with the outside housing 5 of the smoke machine 1 to create a relatively compact, lightweight unit that is easy to lift and transport in the hand of the user. As was also explained, to facilitate the lifting and transport of the combination smoke machine and nitrogen generator, the nitrogen generating membrane tube 14 of the nitrogen generator 3 functions as a gripping handle around which the hand of the user may be wrapped. That is, the nitrogen generating membrane tube 14 is attached to the housing 5 of the smoke machine 1 by the front and rear manifolds 10 and 12 such that a gripping space 58 is established between tube 14 and housing 5 through which to receive the user's hand.

As was also previously described, filtered compressed air enters the nitrogen generating membrane tube 14 of the nitrogen generator 3 at the air input nozzle 20 at the front manifold 10, and nitrogen gas exits the tube 14 by way of the nitrogen flow channel 40 through the rear manifold 12. The rate at which nitrogen gas flows from the tube 14, through the nitrogen flow channel 40 and the nitrogen intake hose 18, and into the sealed enclosure 44 of the smoke generator device 42 is selectively adjusted by means of a pressure regulator 60. The pressure regulator 60 can be set and changed at the control panel 9 of the control unit 56 of the smoke machine 1. By way of example only, the pressure regulator 60 is set to a pressure of about 0.5 psi for applications in which a vehicle fuel tank is tested for leaks.

Nitrogen gas flows from the pressure regulator 60 to a nitrogen supply hose 62 that runs along the bottom of the sealed enclosure 44 of the smoke generator device 42 so as to lie below the liquid 46 contained therein. The nitrogen supply hose 62 communicates at a fitting 64 with the liquid intake channel 49 that runs upwardly through the enclosure 44 and the liquid 46 to be vaporized. Nitrogen gas which is blown, under pressure, from nitrogen supply hose 62 and upwardly from the bottom of the enclosure 44 through the liquid intake channel 49 will draw, by means of suction, some of the liquid 46 into the channel 49 via an orifice 66 formed therein. The suctioned liquid contacts the heating element 48 that is surrounded by the liquid intake channel 49, whereby the liquid is instantaneously vaporized into smoke.

The nitrogen gas which originates at the nitrogen generating membrane tube 14 of the nitrogen generator 3 and is blown under pressure into the liquid intake channel 49 below the surface of the fluid 46 exits the channel 49 above the liquid 46 as an inert, non-combustible carrier gas that is mixed with the smoke to fill the sealed enclosure 44 of the smoke generating device 42. Accordingly, the smoke is carried by the nitrogen gas outwardly of the enclosure 44 to the system to be tested for leaks by way of a smoke exhaust hose 68 that is coupled to enclosure 44, a smoke delivery channel 70 that runs through the rear manifold 12 of the nitrogen generator 3 and is coupled to the smoke exhaust hose 68, and the smoke supply hose (designated 16 in FIG. 1) that is coupled between the smoke delivery channel 70 and the system under test. In the alternative, smoke can be delivered from the smoke exhaust hose 68 directly to the system under test by means of running exhaust hose 68 outwardly from the housing 5 via a hole (not shown) formed therein.

As the smoke within the enclosure 44 of the smoke generator device 42 reaches the system being tested via the smoke supply hose 16, some of the smoke will escape any leak formed therein. Therefore, a visible observation of escaping smoke will provide a quick and easy indication of the presence and location of the leak so that a repair can be made. Should no smoke escape, then the integrity of the system being tested will be verified, and no repair is needed.

It may be appreciated that the smoke machine 1 and nitrogen generator 3 disclosed herein are integrated so as to form a compact, relatively lightweight and hand-held combination which avoids the use and cumbersome interface with long and heavy nitrogen cylinders common to many conventional leak testing apparatus. What is more, and unlike the nitrogen cylinders, the nitrogen generating membrane tube 14 of the nitrogen generator 3 need not be refilled. All that is required to supply nitrogen gas to the smoke machine 1 is to provide readily available and inexpensive compressed air to the nitrogen generating membrane tube 14. By virtue of the foregoing, the combination smoke machine 1 and nitrogen generator 3 of this invention will require little maintenance and experience minimal downtime, because there are no nitrogen cylinders in need of being regularly recharged or serviced.

The invention claimed is:

1. A combination, comprising:
   a smoke machine including a smoke generator device to produce smoke; and
   a source of gas communicating with the smoke generator device of said smoke machine to provide a supply of gas thereto at which to be mixed with the smoke produced by said smoke generator device and to carry the smoke outwardly from said smoke generator device to a closed fluid system to be tested for leaks,
   said source of gas connected to said smoke machine and sized to be grasped in a hand of a user to create a handle at which said smoke machine is lifted and transported.

2. The combination recited in claim 1, wherein said source of gas provides a supply of inert, non-combustible gas to the smoke generator device of said smoke machine to be mixed with the smoke and to carry the smoke outwardly from said smoke generator device to the closed fluid system to be tested for leaks.

3. The combination recited in claim 2, wherein the inert, non-combustible gas supplied to the smoke generator device of said smoke machine from said source of gas is nitrogen gas.

4. The combination recited in claim 1, wherein said source of gas that is connected to said smoke machine and sized to be grasped in the hand of the user to create a handle is a nitrogen generating membrane tube, said nitrogen generating membrane tube adapted to produce the supply of nitrogen gas to be provided to the smoke generator device of said smoke machine.

5. The combination recited in claim 4, wherein said nitrogen generating membrane tube is connected to said smoke machine such that a space is created therebetween through which to receive the hand of the user and thereby enable the user to wrap his hand around said nitrogen generating membrane tube such that the tube creates the handle at which said smoke machine is lifted and transported.

6. The combination recited in claim 5, further comprising at least a first manifold coupled to said nitrogen generating membrane tube, said first manifold connecting said tube to said smoke machine so that said space is created therebetween through which to receive the hand of the user.

7. The combination recited in claim 6, wherein the first manifold coupled to said nitrogen generating membrane tube includes an air input nozzle to be connected to a source of air under pressure, said first manifold having an air flow channel extending therethrough and lying between said air input nozzle and said nitrogen generating tube, whereby air under pressure is supplied from said source thereof to said tube by way of said air flow channel through said first manifold.

8. The combination recited in claim 6, further comprising a second manifold coupled to said nitrogen generating membrane tube and including a nitrogen flow channel extending therethrough and lying between said tube and the smoke generator device of said smoke machine, such that said supply of nitrogen gas is provided from said nitrogen generating membrane tube to the smoke generator device by way of said nitrogen flow channel through said second manifold.

9. The combination recited in claim 8, wherein said smoke machine also includes a nitrogen supply hose extending between the nitrogen flow channel through said second manifold and the smoke generator device of said smoke machine by which to provide the supply of nitrogen gas from said nitrogen generating membrane tube to said smoke generator device, and a pressure regulator communicating with said nitrogen supply hose to adjust the pressure of said nitrogen gas being provided to said smoke generator device via said nitrogen supply hose.

10. The combination recited in claim 8, wherein the second manifold coupled to said nitrogen generating membrane tube includes a smoke delivery channel extending therethrough and being coupled to the smoke generator device of said smoke machine, such that the mixture of the smoke produced by the smoke generator device and the nitrogen gas produced by said nitrogen generating membrane tube is provided to the system to be tested for leaks by way of said smoke delivery channel through said second manifold.

11. The combination recited in claim 10, wherein said smoke machine also includes a smoke exhaust hose extending between the smoke generator device of said smoke machine and the smoke delivery channel through said second manifold, said smoke generator device including a sealed enclosure within which the supply of nitrogen gas produced by said nitrogen generating membrane tube is introduced to the smoke produced by said smoke generator device to create a mixture thereof, said mixture being carried by said nitrogen gas from said smoke generator device to the system being tested for leaks by way of said smoke exhaust hose and said smoke delivery channel.

12. An apparatus for testing a closed fluid system for leaks, said apparatus comprising:
    a smoke machine including a smoke generator device to produce smoke;
    a source of nitrogen gas communicating with the smoke generator device of said smoke machine to provide a supply of nitrogen gas thereto at which to be mixed with the smoke produced by said smoke generator device and carry the smoke outwardly from said smoke generator device to the closed fluid system being tested for leaks; and
    an attachment by which to connect said source of nitrogen gas to said smoke machine so that a space is created therebetween through which to receive the hand of a user, said source of nitrogen gas being sized to be grasped in the hand of the user after the users hand is received through said space, whereby said source of nitrogen gas creates a handle at which said smoke machine is lifted and transported.

13. The apparatus recited in claim 12, wherein said source of nitrogen gas connected by said attachment to said smoke machine and sized to be grasped in the user's hand is a nitrogen generating membrane tube adapted to produce the supply of nitrogen gas to be provided to the smoke generator device of said smoke machine.

14. The apparatus recited in claim 13, wherein said attachment by which to connect said nitrogen generating membrane tube to said smoke machine includes at least a first manifold having an air flow channel running therethrough and communicating with said nitrogen generating membrane tube so that air under pressure can be provided from a source thereof to said tube by way of said air flow channel through said first manifold.

15. The apparatus recited in claim 14, wherein said attachment by which to connect said nitrogen generating membrane tube to said smoke machine also includes a second manifold having a nitrogen flow channel running therethrough and extending between said nitrogen generating membrane tube and the smoke generator device of said smoke machine, such that said supply of nitrogen gas is provided from said tube to said smoke generator device by way of said nitrogen flow channel through said second manifold.

16. The apparatus recited in claim 15, wherein said smoke machine also includes a nitrogen supply hose extending between the nitrogen flow channel through said second manifold and the smoke generator device of said smoke machine by which to provide the supply of nitrogen gas from said nitrogen generating membrane tube to said smoke generator device, and a pressure regulator communicating with said nitrogen supply hose to adjust the pressure of said nitrogen gas being provided to said smoke generator device via said nitrogen supply hose.

17. The apparatus recited in claim 15, wherein said second manifold has a smoke delivery channel extending therethrough and being coupled to the smoke generator device of said smoke machine, such that the mixture of the smoke produced by the smoke generator device and the nitrogen gas produced by said nitrogen generating membrane tube is provided to the system to be tested for leaks by way of said smoke delivery channel through said second manifold.

18. The apparatus recited in claim 17, wherein said smoke machine also includes a smoke exhaust hose extending between the smoke generator device of said smoke machine and the smoke delivery channel through said second manifold, said smoke generator device including a sealed enclosure within which the supply of the nitrogen gas produced by said nitrogen generating membrane tube is introduced to the smoke produced by said smoke generator device to create a mixture thereof, said mixture being carried by said nitrogen gas from said smoke generator device to the system being tested for leaks by way of said smoke exhaust hose and said smoke delivery channel.

19. An apparatus for testing a closed fluid system for leaks, said system comprising:
   a smoke machine including a smoke generator device to produce smoke; and
   a nitrogen generating membrane tube adapted to produce nitrogen gas, said nitrogen generating membrane tube communicating with the smoke generator device of said smoke machine to provide the nitrogen gas thereto at which to be mixed with the smoke produced by said smoke generator device and carry the smoke outwardly from said smoke generator device to the closed fluid system being tested for leaks,
   said nitrogen generating membrane tube attached to said smoke machine such that a space is formed therebetween, said nitrogen generating membrane tube creating a handle at which said smoke machine is lifted and transported when the hand of a user grasps said nitrogen generating membrane tube and is received within said space.

20. The apparatus recited in claim 19, further comprising a manifold system by which to attach said nitrogen generating membrane tube to said smoke machine, said manifold system having an air flow channel running therethrough and extending between a source of air under pressure and said nitrogen generating membrane tube, and also having a nitrogen flow channel running therethrough and extending between said nitrogen generating membrane tube and the smoke generating device of said smoke machine.

\* \* \* \* \*